US011808595B2

(12) United States Patent
Ninagawa et al.

(10) Patent No.: US 11,808,595 B2
(45) Date of Patent: Nov. 7, 2023

(54) COMMUNICATION CONTROL DEVICE, COMMUNICATION CONTROL METHOD, AND NON-TRANSITORY STORAGE MEDIUM

(71) Applicants: TOYOTA JIDOSHA KABUSHIKI KAISHA, Toyota (JP); DENSO CORPORATION, Kariya (JP)

(72) Inventors: Yuji Ninagawa, Handa (JP); Satoshi Niwa, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 237 days.

(21) Appl. No.: 17/491,943

(22) Filed: Oct. 1, 2021

(65) Prior Publication Data
US 2022/0107195 A1 Apr. 7, 2022

(30) Foreign Application Priority Data
Oct. 5, 2020 (JP) ................................ 2020-168632

(51) Int. Cl.
*G01C 21/34* (2006.01)
*H04W 4/029* (2018.01)
*H04W 28/02* (2009.01)

(52) U.S. Cl.
CPC ....... *G01C 21/3492* (2013.01); *G01C 21/343* (2013.01); *G01C 21/3461* (2013.01); *H04W 4/029* (2018.02); *H04W 28/0226* (2013.01)

(58) Field of Classification Search
CPC .............. G01C 21/3492; G01C 21/343; G01C 21/3461; H04W 4/029; H04W 28/0226; H04W 48/16; H04W 88/06; H04W 48/18
See application file for complete search history.

(56) References Cited

U.S. PATENT DOCUMENTS

| 2010/0285827 | A1* | 11/2010 | Kim ...................... H04W 48/14 455/517 |
| 2013/0238807 | A1 | 9/2013 | Wakikawa et al. |
| 2015/0281906 | A1 | 10/2015 | Tseng et al. |
| 2019/0253948 | A1 | 8/2019 | Nagura et al. |
| 2019/0258467 | A1 | 8/2019 | Frantz et al. |

FOREIGN PATENT DOCUMENTS

JP 2005-012563 A 1/2005

* cited by examiner

*Primary Examiner* — Michael V Kerrigan
(74) *Attorney, Agent, or Firm* — Oliff PLC (57) ABSTRACT

A communication control device is configured to: store communication possibility information in which positions at which the communication control device is connectable to an external device and communication modes that are usable at the positions, among a plurality of communication modes, are correlated with each other; acquire a first route as an expected route along which the communication control device is to move; control a communication mode that is used by an application implemented by the communication control device for communication with the external device while the communication control device is moving, based on the first route, communication possibility information, and a communication content required by the application; and execute communication between the application and the external device by using the communication mode controlled by the control unit.

11 Claims, 6 Drawing Sheets

| POSITION | TIME | PASSAGE SPEED | COMMUNICABLE MODE | COMMUNICABLE BAND | WEATHER | TRANSMISSION AND RECEPTION POWER | DISCONNECTION RATE | ERROR RATE |
|---|---|---|---|---|---|---|---|---|
| | | | | ... | ... | | | |
| | | | | | | | | |
| | | | ... | | | | | |
| | | | | | ... | | | |
| | | | | | | | | |
| | | | | ... | | | | |
| | | | | | | ... | | |

COMMUNICATION CONTROL DEVICE, COMMUNICATION CONTROL METHOD, AND NON-TRANSITORY STORAGE MEDIUM

CROSS-REFERENCE TO RELATED APPLICATION

This application claims priority to Japanese Patent Application No. 2020-168632 filed on Oct. 5, 2020, incorporated herein by reference in its entirety.

BACKGROUND

1. Technical Field

The present disclosure relates to a communication control device, a communication control method, and a non-transitory storage medium. The communication control device is used to connect to an external device using a plurality of communication modes, for example.

2. Description of Related Art

In a mobile device that supports a plurality of communication modes (such as cellular (4th generation (4G)/5th generation (5G)) and wireless local area network (LAN)) as communication means for connecting to a network such as the Internet, one suitable communication mode is automatically or manually selected from the plurality of communication modes in accordance with the situation in which the mobile device is in.

Japanese Unexamined Patent Application Publication No. 2005-012563 (JP 2005-012563 A) discloses a system that allows a mobile terminal mounted on a vehicle etc. to perform flexible and stable network communication. In the system, an area in which the vehicle is present a predetermined time later (several seconds later) is predicted based on the present position and speed of the vehicle using information that indicates areas in which communication can be performed through various communication modes, and an optimum communication mode for the mobile device in the predicted area is determined.

SUMMARY

In the technique described in JP 2005-012563 A discussed above, the communication mode of the mobile device at the time when the predetermined time actually elapses since the time of prediction is switched to the communication mode predicted the predetermined time earlier. However, the vehicle may not be present in the predicted area when the communication mode is switched, and network connection may not be made through the communication mode after the change, or a desired communication band may not be obtained. Thus, there is room for further improvement in the system of controlling the communication mode during movement of a device such as a mobile device.

The present disclosure provides a communication control device, a communication control method, and a non-transitory storage medium capable of suitably controlling the communication mode during movement.

A first aspect of the present disclosure provides a communication control device configured to be connected to an external device by using a plurality of communication modes. The communication control device includes: a storage unit configured to store communication possibility information in which positions and communication modes are correlated with each other, the positions being positions at which the communication control device is connectable to the external device, the communication modes being usable at the positions, among the plurality of communication modes; an acquisition unit configured to acquire a first route as an expected route along which the communication control device is to move; a control unit configured to control a communication mode while the communication control device is moving, based on the first route, communication possibility information, and a communication content required by an application, the communication mode being used by the application implemented by the communication control device for communication with the external device; and a communication unit configured to execute communication between the application and the external device by using the communication mode controlled by the control unit.

In the first aspect described above, the communication content may have at least one of a communication data amount, an allowable delay time, whether interruption in communication occurs, and an allowable communication cost; and the control unit may be configured to control a communication mode that is used by the application for the communication with the external device so as to meet the communication content.

In the first aspect described above, the communication control device may include a detection unit configured to detect a power state of the communication control device. The control unit may be configured to control the communication mode that is used by the application for the communication with the external device so as to meet the communication content based on variations of the power state predicted on the first route.

In the first aspect described above, the communication unit may be configured to execute the communication between the application and the external device based on a priority degree of each of requests when the requests are generated from the application.

In the first aspect described above, the communication control device may include a route examination unit configured to suggest a second route that is different from the first route, based on the first route, the communication possibility information, and the communication content. The control unit may be configured to control the communication mode by changing the expected route from the first route to the second route when the second route is determined to meet a condition required for the expected route. The communication mode may be used by the application for the communication with the external device. The expected route may be a route along which the communication control device is to move.

In the first aspect described above, the second route may be a route with a high communication efficiency compared to the first route.

In the first aspect described above, the condition required for the expected route may have at least one of an arrival time at a destination location of the expected route and a cost of transfer to the destination location.

In the first aspect described above, the control unit may be configured to implement a change from the first route to the second route based on permission by a user of the communication control device.

In the first aspect described above, the positions may be further correlated with at least one of a time, a weather, a passage speed, a communication band, power required for communication, a communication disconnection rate, and a communication error rate, together with the communication modes, in the communication possibility information.

A second aspect of the present disclosure provides a communication control method executed by a computer of a communication control device configured to be connected to an external device by using a plurality of communication modes. The communication control method includes: acquiring a first route as an expected route along which the communication control device is to move; controlling a communication mode while the communication control device is moving, based on the first route, communication possibility information, and a communication content required by an application, the communication mode being used by the application implemented by the communication control device for communication with the external device, the communication possibility information being information that a storage unit of the communication control device stores and in which positions and communication modes are correlated with each other, the positions being positions at which the communication control device is connectable to the external device, the communication modes being usable at the positions among the plurality of communication modes; and executing communication between the application and the external device by using the controlled communication mode.

A third aspect of the present disclosure provides a non-transitory storage medium storing instructions that are executable by one or more processors in a computer of a communication control device configured to be connected to an external device by using a plurality of communication modes, and that cause the one or more processors to execute functions. The functions include: acquiring a first route as an expected route along which the communication control device is to move; controlling a communication mode while the communication control device is moving, based on the first route, communication possibility information, and a communication content required by an application, the communication mode being used by the application implemented by the communication control device for communication with the external device, the communication possibility information being information that a storage unit of the communication control device stores and in which positions and communication modes are correlated with each other, the positions being positions at which the communication control device is connectable to the external device, the communication modes being usable at the positions among the plurality of communication modes; and executing communication between the application and the external device by using the controlled communication mode.

In the first aspect, the second aspect, and the third aspect of the present disclosure, the communication mode that is used by the application for communication with the external device while the communication control device is moving is controlled based on the expected route (first route), the communication possibility information, and the communication content required by the application. Therefore, the communication mode during movement can be controlled more suitably.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A communication control device according to the present disclosure controls a communication mode that is used by an application implemented by the communication control device for communication with an external device while the communication control device is moving, based on a route along which the communication control device is expected to move, communication possibility information in which positions at which the communication control device is connectable to the external device and communication modes that are usable at the positions are correlated with each other, and the communication content determined by a data transmission/reception request generated by the application. Through this control, a situation in which the communication control device is not connectable to the external device at an expected position or a desired communication band cannot be obtained although the communication control device is connectable to the external device, is avoided, and therefore the communication mode during movement of the communication control device can be controlled appropriately.

The communication control device according to the present disclosure is a device configured to be connectable to an external device using a plurality of communication modes. Embodiments of the present disclosure will be described in detail below with reference to the drawings using an example in which a communication control device is mounted on a mobile device such as a vehicle.

First Embodiment

Configuration

Figure 1:
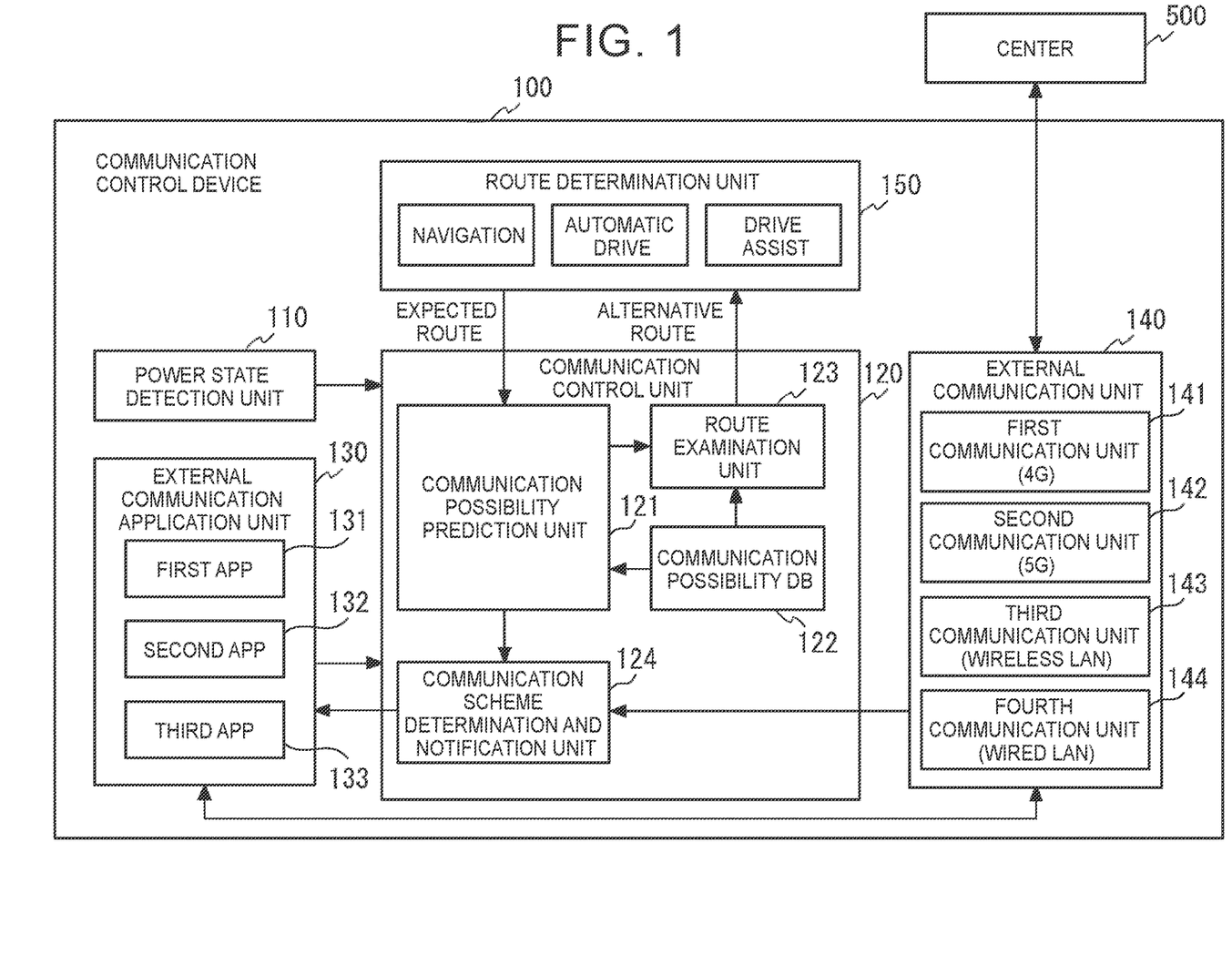
FIG. 1 is a functional block diagram of a communication control device according to a first embodiment and the surroundings.

FIG. 1 is a functional block diagram of a communication control device 100 according to a first embodiment of the present disclosure and the surroundings. The functional blocks illustrated in FIG. 1 include a communication control device 100 mounted on a vehicle and a center 500.

The center 500 is an external device, other than a vehicle, that communicates with the communication control device 100 to receive a service provided by the communication control device 100 and provide a service of the center 500 itself to the communication control device 100. The center 500 may be a stationary device such as a server, or may be a mobile terminal such as a smartphone, for example.

The communication control device 100 includes a power state detection unit 110, a communication control unit 120, an external communication application unit 130, an external communication unit 140, and a route determination unit 150. The communication control device 100 has a processor, a main storage unit, an auxiliary storage unit, etc. These are connected to each other through a bus. The processor may be a central processing unit (CPU), a digital signal processor (DSP), etc. The processor performs various computations for information processing. The main storage unit may be a random access memory (RAM), a read only memory (ROM), etc. The auxiliary storage unit may be an erasable programmable ROM (EPROM), a hard disk drive (HDD), a solid state drive (SSD), a removable medium, etc. The auxiliary storage unit stores an operating system (OS), various programs, various tables, etc. The processor loads a program stored in the auxiliary storage unit to a work area of the main storage unit, executes the program, and controls the various constituent units etc. through execution of the program. The main storage unit and the auxiliary storage unit are each a computer-readable storage medium. Information stored in the auxiliary storage unit may be stored in the main storage unit. Meanwhile, information stored in the main storage unit may be stored in the auxiliary storage unit.

The power state detection unit 110 can detect the present power state of the communication control device 100, and estimate a future power state of the communication control device 100 based on an expected route output from the route determination unit 150 to be discussed later. The power state of the communication control device 100 may be the amount of power accumulated in a battery (not illustrated) built in the communication control device 100, the state of charge and discharge of the battery, etc. For example, when the communication control device 100 is mounted on an electric vehicle (plug-in hybrid vehicle (PHV)) that is chargeable in a plug-in manner, the state of charge and discharge of the vehicle may be set to an "IG state" in which an in-vehicle battery can be charged with power generated by a motor/generator, a "+B state" in which the motor/generator is not generating power and the in-vehicle battery is not charged, a "Plug-In state" in which the in-vehicle battery is charged from an external power source device in a plug-in manner, etc. In addition, the power state detection unit 110 can detect power that can be presently used by the communication control device 100, and estimate power that can be used by the communication control device 100 on the expected route. The power state detection unit 110 outputs information related to the power state of the communication control device 100 and power that is usable to the communication control unit 120.

The external communication application unit 130 includes an application implemented by the communication control device 100, and can implement a predetermined service through communication with the center 500. In the present embodiment, the external communication application unit 130 implements three applications, namely a first app 131, a second app 132, and a third app 133. However, the number of applications implemented by the communication control device 100 is not limited thereto.

The external communication application unit 130 outputs a data transmission request and/or a data reception request (hereinafter referred to as a "communication need") generated from one or more of the first app 131, the second app 132, and the third app 133 to the communication control unit 120. The communication need includes, as a content required for communication (communication content), constraint information related to at least one of the amount of data for communication (communication data amount), the time by which a delay in communication is allowed (allowable communication delay time), whether communication may be interrupted (communication interruption possibility), and the allowable cost for communication (allowable communication cost), for example. In addition, the external communication application unit 130 receives a notification of a communication mode and a communication timing of the external communication unit 140 permitted in order to meet the communication need from the communication control unit 120 (a communication scheme determination and notification unit 124 to be discussed later). Then, the external communication application unit 130 implements data transmission to the center 500 or data reception from the center 500 via the external communication unit 140 based on the notification received from the communication control unit 120.

Examples of the applications implemented by the external communication application unit 130 include an application (Field of Test (FOT) app) that occasionally uploads predetermined data (field data) collected during travel of the vehicle to the center 500. Other examples include an application (hybrid navigation app) that downloads map data on an expected travel destination to be used for navigation, or so-called hybrid navigation, in which map data required for route guidance are acquired as appropriate from the center 500. In addition, an application (remote service app) that uploads data related to the state of the vehicle to the center 500 based on a request from the center 500 is conceivable. Other examples include an application (Over The Air (OTA) app) that downloads an update program for updating software of an electronic control unit (ECU) etc. from the center 500.

The external communication unit 140 is a communication interface for connecting the communication control device 100 to the center 500 directly or via a network. The external communication unit 140 according to the present embodiment includes, as communication means, a first communication 141 unit that uses a cellular 4G communication mode, a second communication unit 142 that uses a cellular 5G communication mode, a third communication unit 143 that uses a wireless local area network (LAN) communication mode, and a fourth communication unit 144 that uses a wired LAN communication mode. The number of communication units included in the external communication unit 140 and the communication modes to be supported are not limited to those indicated in the drawing. In addition, the external communication unit 140 outputs operation information that indicates whether each of the first communication unit 141, the second communication unit 142, the third communication unit 143, and the fourth communication unit 144 is operating normally to the communication control unit 120 (the communication scheme determination and notification unit 124 to be discussed later).

The route determination unit 150 can determine an expected route along which the communication control device 100 is to move (travel). The route determination unit 150 includes a navigation function that provides guidance on the route to a destination location based on the map data, an automatic drive function that causes the vehicle to perform all the drive control, and a drive assist function that causes the vehicle to assist a part of drive control such as Adaptive Cruise Control (ACC), by way of example. The route determination unit 150 outputs information (such as passage positions and movement speeds between the passage positions) related to the expected route determined by such functions to the communication control unit 120 (a communication possibility prediction unit 121 to be discussed later). In addition, when an alternative route is suggested from the communication control unit 120 (a route examination unit 123 to be discussed later), the route determination unit 150 can determine whether a change is made from the present expected route to the alternative route based on a predetermined condition determined in accordance with the safety and the movement need (such as arrival time, transfer cost, and comfort).

The communication control unit 120 controls communication made between the communication control device 100 and the center 500. The communication control unit 120 includes the communication possibility prediction unit 121, a communication possibility database (DB) 122, the route examination unit 123, and the communication scheme determination and notification unit 124.

Figure 2:
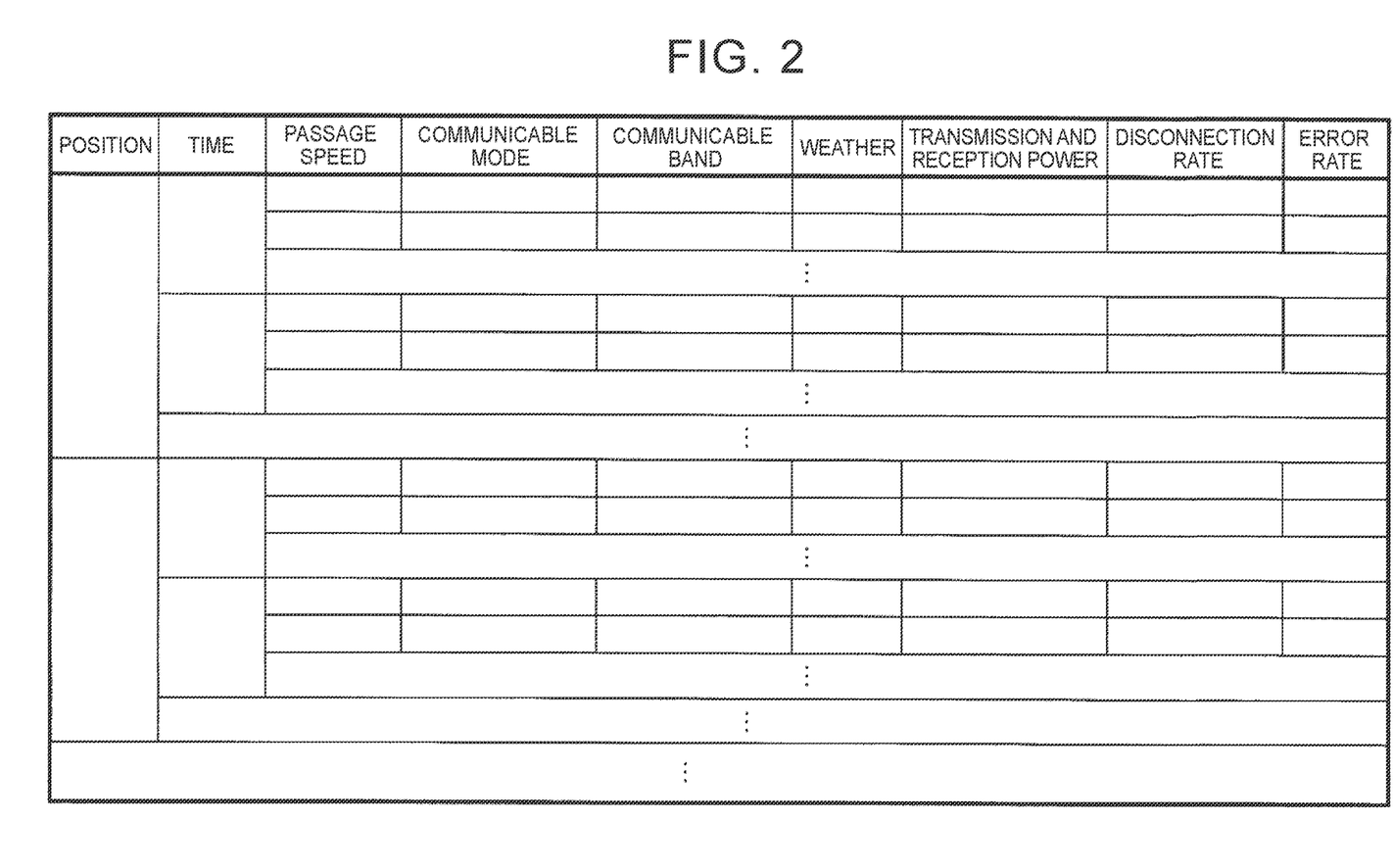
FIG. 2 illustrates an example of communication possibility information stored in a communication possibility database.

The communication possibility database 122 is a storage unit that stores communication possibility information in which positions at which the communication control device 100 is connectable to the center 500 and communication modes that are usable at the positions, among the plurality of communication modes of the external communication unit 140, are at least correlated with each other. FIG. 2 illustrates an example of the communication possibility information stored in the communication possibility database 122.

In the communication possibility information illustrated in FIG. 2, the passage speed, the communicable mode, the communicable band, the weather, the transmission and reception power, the disconnection rate, and the error rate are stored in correlation with each time at each position. The position may be a location (a so-called node in the map data terminology) indicated by the latitude and the longitude, a line (a so-called link) that connects between two locations, an area (a so-called mesh) surrounded by four locations, etc., by way of example. The time is basically information defined by hour and minute, and may further include information such as month, day, and day of the week. The passage speed is the speed at which the communication control device 100 passes the position. When the position is a line or an area, the passage speed may be an instantaneous value of the speed at a certain location, or may be the average value or the maximum value of the speed. The communicable mode indicates a communication mode that can be used by the communication control device 100 at the position under conditions of the time and the passage speed. The communicable band indicates a communication band that can be used by the communication control device 100 at the position under conditions of the time, the passage speed, and the communication mode. The weather indicates a meteorological state such as sunny, rainy, and snowy, and indicates the weather at the time when the passage speed, the communicable mode, and the communicable band are obtained at the position and the time. The transmission/reception power indicates power that can be transmitted from and received by the communication control device 100 at the position under conditions of the time, the passage speed, the communication mode, and the weather. The disconnection rate indicates the possibility of occurrence of disconnection in communication between the communication control device 100 and the center 500 at the position under conditions of the time, the passage speed, the communication mode, the communicable band, the weather, and the transmission and reception power. The error rate indicates the possibility of occurrence of an error in communication between the communication control device 100 and the center 500 at the position under conditions of the time, the passage speed, the communication mode, the communicable band, the weather, and the transmission and reception power. Information on the weather, the transmission and reception power, the disconnection rate, and the error rate discussed above may be omitted. When the communication possibility information is different in accordance with the location of attachment of a communication antenna of the communication control device 100, communication possibility information may be stored for each location of attachment of the communication antenna.

The communication possibility prediction unit 121 acquires an expected route determined by the route determination unit 150. The communication possibility prediction unit 121 predicts the possibility of communication on the expected route acquired from the route determination unit 150 based on information (such as position and speed) related to the state of the communication control device 100, information (such as time and weather) related to the surrounding state of the communication control device 100, and the communication possibility information stored in the communication possibility database 122. In the present embodiment, the possibility of communication corresponds to the communicable mode, the communicable band, the transmission and reception power, the disconnection rate, and the error rate.

The communication scheme determination and notification unit 124 determines a communication mode and a communication timing that are optimal for executing the communication need received from the external communication application unit 130 based on at least the possibility of communication on the expected route predicted by the communication possibility prediction unit 121 and operation information output from the external communication unit 140. When there is a plurality of communication needs, the communication scheme determination and notification unit 124 determines the communication mode and the communication timing for each of the communication needs based on the priority degree etc. given in advance to each communication need. In addition, the communication scheme determination and notification unit 124 may further determine a communication mode and a communication timing that are optimal for executing the communication need based on the power state of the communication control device 100 detected by the power state detection unit 110 and predicted power that can be used on the expected route. The communication mode and the communication timing may be determined for each of the apps (first app 131, second app 132, and third app 133) implemented by the external communication application unit 130, rather than for each communication need. Then, the communication scheme determination and notification unit 124 notifies the external communication application unit 130 of the communication mode for executing the communication need in accordance with the communication mode and the communication timing that have been determined.

The route examination unit 123 examines whether there is an optimum route for executing the communication need received from the external communication application unit 130 other than the present expected route already determined by the route determination unit 150. This examination is performed based on the communication data amount, the allowable communication delay time, the communication interruption possibility, and the allowable communication cost, which are the communication content required by the communication need. The content of the examination will be discussed in detail later. In addition, the route examination unit 123 may further examine whether power can be reduced based on the power state of the communication control device 100 detected by the power state detection unit 110 and predicted power that can be used on the expected route.

The route examination unit 123 suggests a change to an alternative route to the route determination unit 150 when there is an optimum alternative route other than the expected route as a result of route examination.

A part or all of the communication control device 100 discussed above may be constituted as an electronic control unit (ECU) typically including a processor such as a microcomputer, a memory, an input-output interface, etc. The electronic control unit can implement some or all of the functions of the power state detection unit 110, the communication control unit 120, the external communication application unit 130, the external communication unit 140, and the route determination unit 150, by the processor reading and executing a program stored in the memory.

Control

Figure 3A:
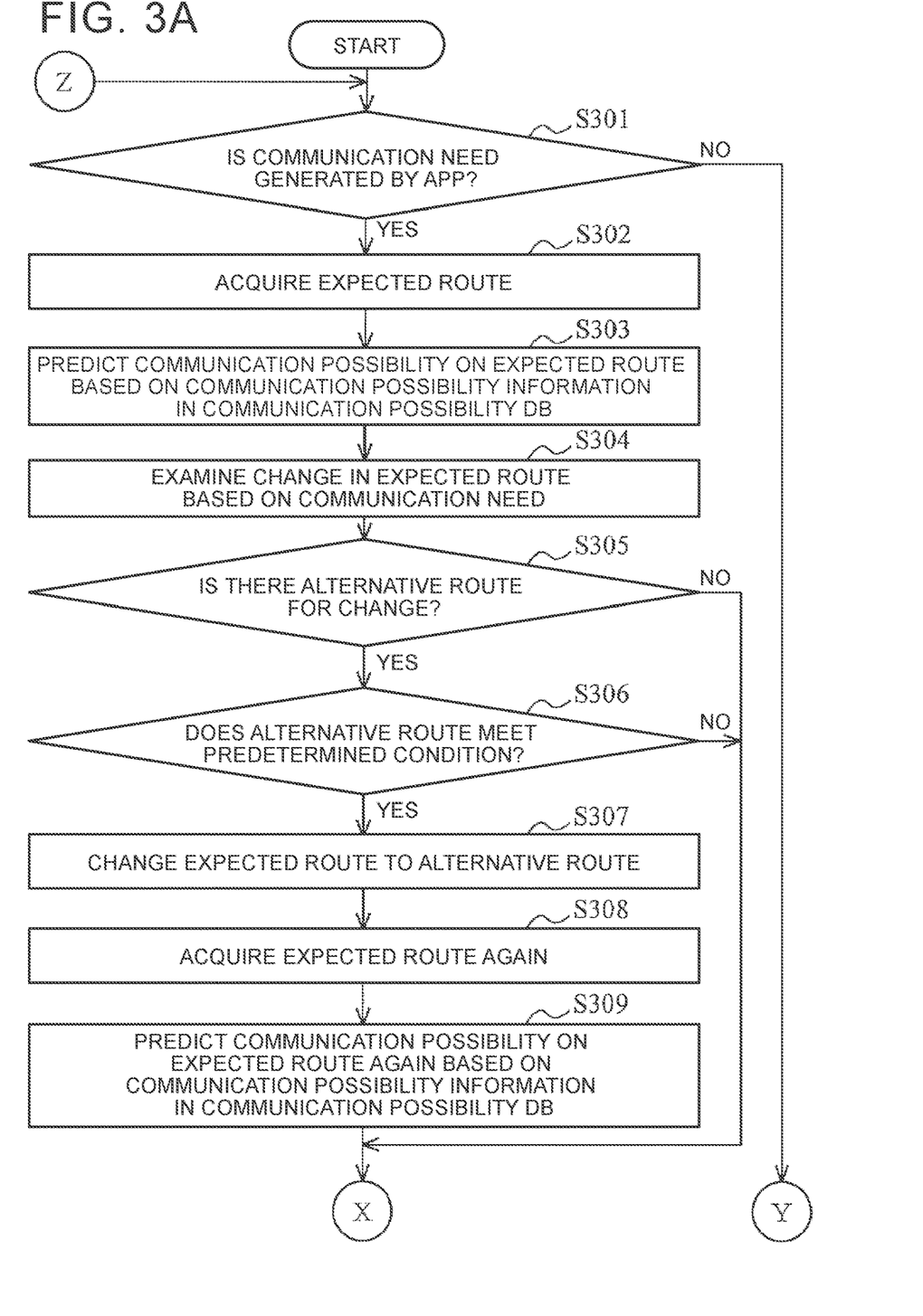
FIG. 3A is a flowchart illustrating the process procedure of communication control executed by the communication control device according to the first embodiment.
Figure 3B:
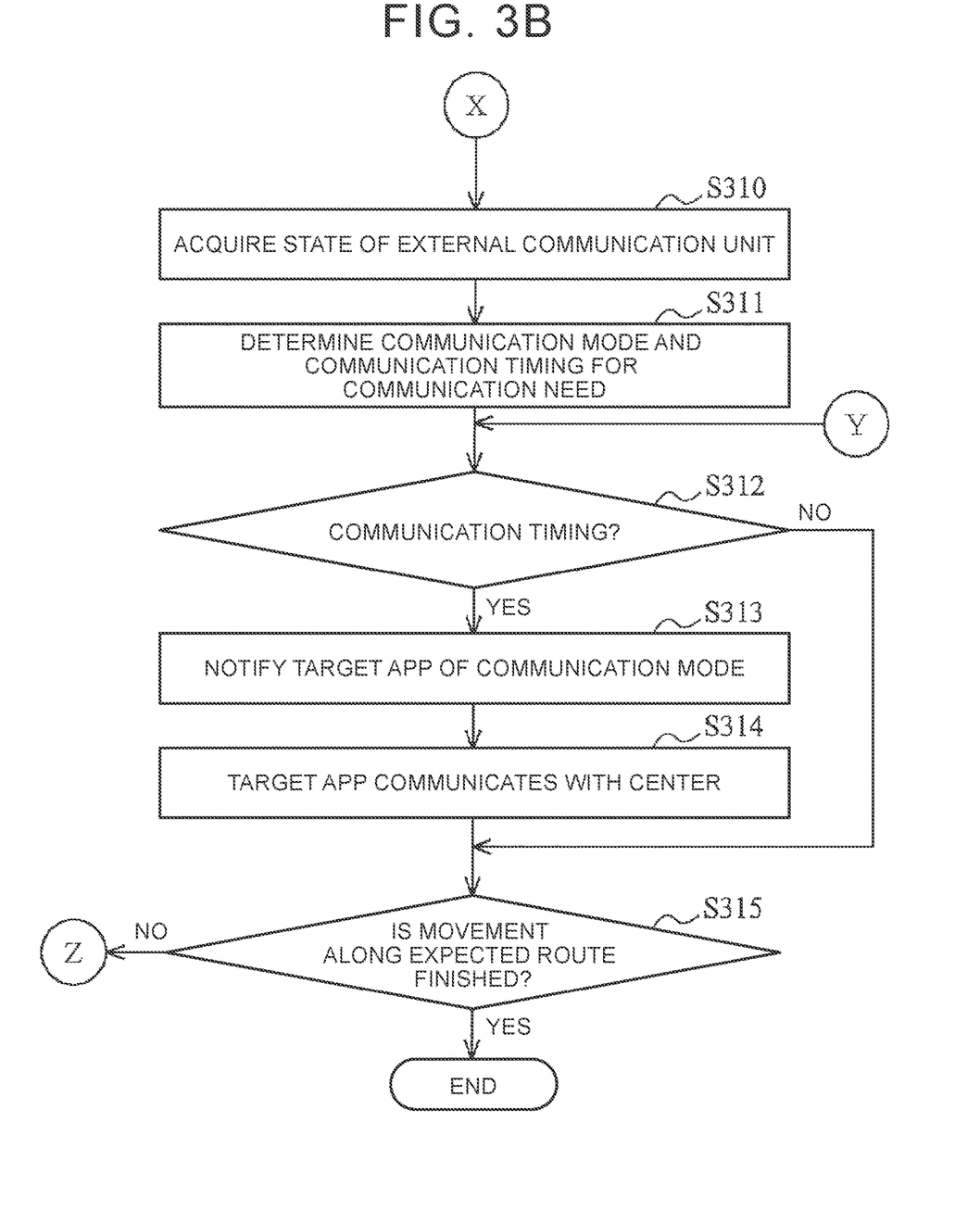
FIG. 3B is a flowchart illustrating the process procedure of communication control executed by the communication control device according to the first embodiment.

Next, control performed by the communication control device 100 according to the present embodiment will be described further with reference to FIGS. 3A and 3B. FIGS. 3A and 3B are each a flowchart illustrating the process procedure of communication control executed by the communication control device 100. The process in FIG. 3A and the process in FIG. 3B are connected to each other by connectors X, Y, and Z.

The communication control illustrated in FIGS. 3A and 3B is started when the route determination unit 150 determines an expected route along which the communication control device 100 is expected to move, for example.

Step S301

The external communication application unit 130 determines whether one or more communication needs are newly generated in the first app 131, the second app 132, and the third app 133. When a communication need is newly generated (YES in step S301), the process proceeds to step S302. The generated communication need is output to the communication control unit 120. When a communication need is not newly generated (NO in step S301), on the other hand, the process proceeds to step S312.

Step S302

When the communication need is input (received) from the external communication application unit 130, the communication possibility prediction unit 121 of the communication control unit 120 acquires an expected route (first route) determined by the route determination unit 150 from the route determination unit 150. When the expected route (first route) is acquired, the process proceeds to step S303.

Step S303

The communication possibility prediction unit 121 of the communication control unit 120 predicts the communication possibility (such as communicable mode and communicable band) at each position on the expected route (first route) determined by the route determination unit 150, based on the communication possibility information stored in the communication possibility database 122. When the communication possibility on the expected route (first route) is predicted, the process proceeds to step S304.

Step S304

The route examination unit 123 of the communication control unit 120 examines a change in the expected route (first route) based on the expected route (first route) determined by the route determination unit 150, the communication need generated in the external communication application unit 130, and the communication possibility information stored in the communication possibility database 122. Specifically, the route examination unit 123 examines whether there is an alternative route (second route) that can meet the communication content (communication data amount, allowable communication delay time, communication interruption possibility, and allowable communication cost) required by the communication need better than moving along the present expected route (first route). Examples of the case where the requirement from the communication need is met better include a case where the communication efficiency is improved, such as a case where the communication cost can be reduced with the alternative route (second route) which passes by way of a position at which wireless LAN is usable while the expected route (first route) does not pass through a position at which wireless LAN is usable, and a case where communication can be made with a shorter delay time with the alternative route (second route) although communication can still be made with the allowable communication delay time or less with even the expected route (first route). Information such as map data that is necessary for examination of a route change may be acquired from the route determination unit 150, may be held by the route examination unit 123 itself, or may be acquired from another component. When a change in the expected route (first route) is examined, the process proceeds to step S305.

Step S305

The route examination unit 123 of the communication control unit 120 determines whether there is any alternative route (second route) for a change as a result of examining a change in the expected route (first route). There may be one or two or more alternative routes (second routes). When there is any alternative route (second route) (YES in step S305), the process proceeds to step S306. The alternative route (second route) is output to the route determination unit 150, and a change in the expected route (first route) is suggested. When there is no alternative route (second route) (NO in step S305), on the other hand, the process proceeds to step S310.

Step S306

The route determination unit 150 determines whether the alternative route (second route) suggested from the communication control unit 120 meets a predetermined condition required for the present expected route (first route). Examples of the predetermined condition include the desired time of arrival at the destination location, the transfer cost (such as fuel cost and toll road fee) to be paid for travel to the destination location, and the comfort (such as the presence or absence of traffic congestion and the presence or absence of a mountain road). When the alternative route (second route) meets the predetermined condition (YES in step S306), the process proceeds to step S307. When the alternative route (second route) does not meet the predetermined condition (NO in step S306), the process proceeds to step S310.

Step S307

The route determination unit 150 changes the expected route of the communication control device 100 from the present expected route (first route) to the alternative route (second route). When the expected route is changed, the process proceeds to step S308.

Step S308

The communication possibility prediction unit 121 of the communication control unit 120 acquires the expected route (second route) after the change again from the route determination unit 150. When the expected route (second route) is acquired again, the process proceeds to step S309.

Step S309

The communication possibility prediction unit 121 of the communication control unit 120 predicts the communication possibility at each position on the expected route (second route) again, based on the communication possibility information stored in the communication possibility database 122. When the communication possibility on the expected route (second route) is predicted again, the process proceeds to step S310.

Step S310

The communication scheme determination and notification unit 124 of the communication control unit 120 acquires the state of the external communication unit 140. The state of the external communication unit 140 is information that indicates whether each of the first communication unit 141, the second communication unit 142, the third communication unit 143, and the fourth communication unit 144 is in a usable state. Examples of an unusable state include a fault of the communication unit and a failure to supply power to the communication unit. When the state of the external communication unit 140 is acquired, the process proceeds to step S311.

Step S311

The communication scheme determination and notification unit 124 of the communication control unit 120 determines a communication scheme that indicates a communication mode and a communication timing for the communication need generated by the external communication application unit 130, based on the communication possibility on the expected route (first route or second route) predicted by the communication possibility prediction unit 121 and the state of the external communication unit 140. Examples of the communication scheme include the use of the wireless LAN communication mode via the third communication unit 143 at the timing of passage through a position P1 and the use of the cellular 5G communication mode via the first communication unit 141 at the timing of passage through a position P2 for a communication need N. When the communication scheme is determined, the process proceeds to step S312.

Step S312

The communication scheme determination and notification unit 124 of the communication control unit 120 determines whether the communication timing indicated by the determined communication scheme has arrived. When the communication timing has arrived (YES in step S312), the process proceeds to step S313. When the communication timing has not arrived (NO in step S312), the process proceeds to step S315.

Step S313

The communication scheme determination and notification unit 124 of the communication control unit 120 notifies a target application (hereinafter referred to as a "target app") in the external communication application unit 130 of the communication mode to be used at the communication timing determined in step S312. When the target app is notified of the communication mode, the process proceeds to step S314.

Step S314

The target app in the external communication application unit 130 communicates with the center 500 using the communication mode indicated by the communication control unit 120. Specifically, the target app requests the external communication unit 140 for communication with the center 500 made using the communication mode indicated by the communication control unit 120, and the external communication unit 140 achieves communication between the target app and the center 500 in response to the request. When communication between the target app and the center 500 is made, the process proceeds to step S315.

Step S315

The route determination unit 150 determines whether movement along the expected route (first route or second route) by the communication control device 100 has been finished. The movement is finished when the communication control device 100 has canceled the movement along the expected route, when the communication control device 100 has arrived at the destination location of the expected route, etc. When movement along the expected route has not been finished (NO in step S315), the process proceeds to step S301. When movement along the expected route has been finished (YES in step S315), the process of the present communication control is ended.

By using the expected route along which the communication control device 100 is to move as discussed above, it is possible to precisely predict the communication mode that can be used by the communication control device 100 for communication with the center 500 beforehand. Consequently, it is possible to suppress occurrence of a malfunction such as a failure to use (establish a connection using) a future communication mode predicted based on the present situation, or a failure to obtain a predicted future communication band.

SPECIFIC EXAMPLES

Next, the communication control executed by the communication control device 100 discussed above will be described using several specific examples.

(1) Example of Data Transmission Performed by FOT App Using Wi-Fi (Registered Trademark) Communication as Much as Possible When test data are accumulated in the FOT app, a communication need that requests data transmission from the FOT app to the center 500 is generated. The communication need includes, as a required communication content, constraint information such as the communication data amount (e.g. 1 GB) which is calculated from the accumulated data, the allowable communication delay time (e.g. 12 hours) which is calculated from the degree of importance of the remaining test data or the remaining storage capacity, and the communication interruption possibility (e.g. the possibility of interruption) and the allowable communication cost (e.g. a minimum cost with only Wi-Fi communication) which are derived from the properties of the app.

The communication possibility prediction unit 121 predicts that cellular 4G communication is available at several positions (passage locations) on the present expected route, and that wireless LAN communication is available at several other positions (intersections and parking lots), based on the communication possibility information stored in the communication possibility database 122.

The route examination unit 123 examines a route that meets the communication content required by the communication need better than the expected route based on the communication possibility information stored in the communication possibility database 122, and derives an alternative route including two intersections at which wireless LAN communication is usable while the vehicle is stationary at a red signal, and parking lots in which wireless LAN communication is usable.

The route determination unit 150 checks whether the alternative route derived by the route examination unit 123 meets a predetermined condition (such as safety and the desired time of arrival at the destination location) required for the present expected route. In this example, the predetermined condition is met, and therefore the route determination unit 150 changes the expected route to the alternative route.

The communication scheme determination and notification unit 124 determines a communication scheme in which the communication timing is a time point when the vehicle is stationary at a red signal at two intersections and the communication mode is wireless LAN based on the expected route (alternative route) after the change and the communication content required by the communication need. Then, the communication scheme determination and notification unit 124 instructs the FOT app to transmit data to the center 500 through connection via wireless LAN at the timing when the communication control device 100 is stationary at an intersection while moving along the expected route in accordance with the determined communication scheme.

Upon receiving the instruction from the communication scheme determination and notification unit 124 at an intersection, the FOT app requests the third communication unit 143 to transmit test data to the center 500 through wireless LAN communication in response to the instruction.

If all the test data have not been transmitted to the center 500 yet at the time point of arrival at a parking lot, the communication scheme determination and notification unit 124 instructs the FOT app to transmit data to the center 500 through connection via wireless LAN. At this time, when connection to wireless LAN is available at only a limited location in the parking lot, the route examination unit 123 considers again a route change for moving to a parking space in which connection to wireless LAN is available. Then, the communication scheme determination and notification unit 124 instructs the FOT app to transmit data to the center 500 through connection via wireless LAN at the timing when the communication control device 100 has moved to a parking space in which connection to wireless LAN is available.

Upon receiving the instruction from the communication scheme determination and notification unit 124 at a parking lot, the FOT app requests the third communication unit 143 to transmit test data to the center 500 through wireless LAN communication in response to the instruction.

(2) Example of Data Reception Performed by Hybrid Navigation App Using Cellular Communication and Wi-Fi Communication When hybrid navigation requires map data for a region in which the vehicle is expected to travel in the future, a communication need that requests data reception at the hybrid navigation app from the center 500 is generated. The communication need includes, as a required communication content, constraint information such as the map data amount (e.g. 100 MB) for the expected travel region, the allowable communication delay time (e.g. 30 minutes) which is calculated from the expected time of arrival at the expected travel region, and the communication interruption possibility (e.g. the possibility of interruption) and the allowable communication cost (e.g. a standard cost with use of cellular and Wi-Fi communication) which are derived from the properties of the app, for example.

The communication possibility prediction unit 121 predicts that cellular 4G and 5G communication is available at several positions (passage locations) on the present expected route, and that wireless LAN communication is available at several other positions (intersections), based on the communication possibility information stored in the communication possibility database 122.

The communication scheme determination and notification unit 124 determines a communication scheme in which the communication timing is a time point when the vehicle is stationary at a red signal at two intersections and the communication mode is wireless LAN in order to give priority to the communication cost before 20 minutes pass, and in which the communication timing is a time point when connection can be established and the communication mode is cellular 4G and 5G communication in order to give priority to the communication delay time after 20 minutes pass, based on the expected route and the communication content required by the communication need. Then, the communication scheme determination and notification unit 124 instructs the hybrid navigation app to receive map data from the center 500 through connection via wireless LAN at the timing when the communication control device 100 is stationary at an intersection while moving along the expected route in accordance with the determined communication scheme.

Upon receiving the instruction from the communication scheme determination and notification unit 124 at an intersection, the hybrid navigation app requests the third communication unit 143 to receive map data from the center 500 through wireless LAN communication in response to the instruction.

When 20 minutes pass since generation of the communication need (irrespective of passing an intersection), the communication scheme determination and notification unit 124 instructs the hybrid navigation app to receive map data from the center 500 through connection via cellular 4G or 5G at the timing when the communication control device 100 can make cellular communication.

Upon receiving the instruction from the communication scheme determination and notification unit 124, the hybrid navigation app requests the first communication unit 141 or the second communication unit 142 to receive map data from the center 500 through cellular 4G or 5G communication in response to the instruction.

(3) Example of Data Transmission Performed Using Cellular Communication upon Request from Center in Remote Service When a remote service provided at the center 500 requires present state data held by a remote service app implemented by the communication control device 100 for the communication control device 100 which is stationary, a communication need that requests data transmission from the remote service app to the center 500 is generated. The communication need includes, as a required communication content, information such as the amount of present state data (e.g. 100 KB), and the allowable communication delay time (e.g. instantly), the communication interruption possibility (e.g. the impossibility of interruption), and the allowable communication cost (e.g. a maximum cost with use of only cellular communication) which are derived from the properties of the app, for example.

The communication possibility prediction unit 121 predicts that cellular 4G and 5G communication and wireless LAN communication are available at positions at which the vehicle is stationary, based on the communication possibility information stored in the communication possibility database 122.

The communication scheme determination and notification unit 124 determines a communication scheme in which the communication mode is cellular 5G communication in accordance with the communication content required by the communication need. Then, the communication scheme determination and notification unit 124 instructs the remote service app to instantly transmit state data to the center 500 through connection via cellular 5G communication in accordance with the determined communication scheme.

Upon receiving the instruction from the communication scheme determination and notification unit 124, the remote service app requests the second communication unit 142 to transmit state data to the center 500 through cellular 5G communication in response to the instruction.

(4) Example in which FOT App and OTA App Generate Communication Need at Same Timing When test data are accumulated in the FOT app, a communication need that requests data transmission from the FOT app to the center 500 is generated. The communication need includes, as a required communication content, information such as the communication data amount (e.g. 1 GB) which is calculated from the accumulated data, the allowable communication delay time (e.g. 12 hours) which is calculated from the degree of importance of the remaining test data or the remaining storage capacity, and the communication interruption possibility (e.g. the possibility of interruption) and the allowable communication cost (e.g. a minimum cost with only Wi-Fi communication) which are derived from the properties of the app.

When the OTA app receives a request to receive update data from a user such as a driver, a communication need that requests data reception at the OTA app from the center 500 is generated. The communication need includes, as a required communication content, information such as the update data amount (e.g. 200 MB), the allowable communication delay time (e.g. 1 hour) which is calculated from the fact that the request is from a user, and the communication interruption possibility (e.g. the possibility of interruption) and the allowable communication cost (e.g. a minimum cost with only Wi-Fi communication) which are derived from the properties of the app, for example.

The communication possibility prediction unit 121 predicts that cellular 4G communication is available at several positions (passage locations) on the present expected route, and that wireless LAN communication is available at several other positions (intersections and parking lots), based on the communication possibility information stored in the communication possibility database 122.

The route examination unit 123 examines a route that meets the communication content required by at least one of the communication needs better than the expected route based on the communication possibility information stored in the communication possibility database 122, and derives an alternative route including two intersections at which wireless LAN communication is usable while the vehicle is stationary at a red signal, and parking lots in which wireless LAN communication is usable.

The route determination unit 150 checks whether the alternative route derived by the route examination unit 123 meets a predetermined condition (such as safety and the desired time of arrival at the destination location) required for the present expected route. In this example, the predetermined condition is met, and therefore the route determination unit 150 changes the expected route to the alternative route.

The communication scheme determination and notification unit 124 determines to give priority to the communication need for the OTA app over the communication need for the FOT app based on the allowable communication delay time of the two communication needs. The priority degree of each communication need may be given in advance in the communication content required by the communication need. Then, the communication scheme determination and notification unit 124 determines a communication scheme in which the communication timing is a time point when the vehicle is stationary at a red signal at two intersections, the communication mode is wireless LAN, the first priority is given to the communication need for the OTA app, and the second priority is given to the communication need for the FOT app based on the expected route (alternative route) after the change and the communication content required by the two communication needs.

The communication scheme determination and notification unit 124 instructs the OTA app to receive update data from the center 500 through connection via wireless LAN at the timing when the communication control device 100 is stationary at an intersection while moving along the expected route in accordance with the determined communication scheme.

Upon receiving the instruction from the communication scheme determination and notification unit 124 at an intersection, the OTA app requests the third communication unit 143 to receive update data from the center 500 through wireless LAN communication in response to the instruction.

When the OTA app has received all the update data, the communication scheme determination and notification unit 124 instructs the FOT app to transmit data to the center 500 through connection via wireless LAN at the timing when the communication control device 100 is stationary at an intersection while moving along the expected route in accordance with the determined communication scheme.

Upon receiving the instruction from the communication scheme determination and notification unit 124 at an intersection, the FOT app requests the third communication unit 143 to transmit test data to the center 500 through wireless LAN communication in response to the instruction.

As seen from the specific examples discussed above, the communication control device according to the present embodiment can determine a communication mode suitably.

Second Embodiment

Figure 4:
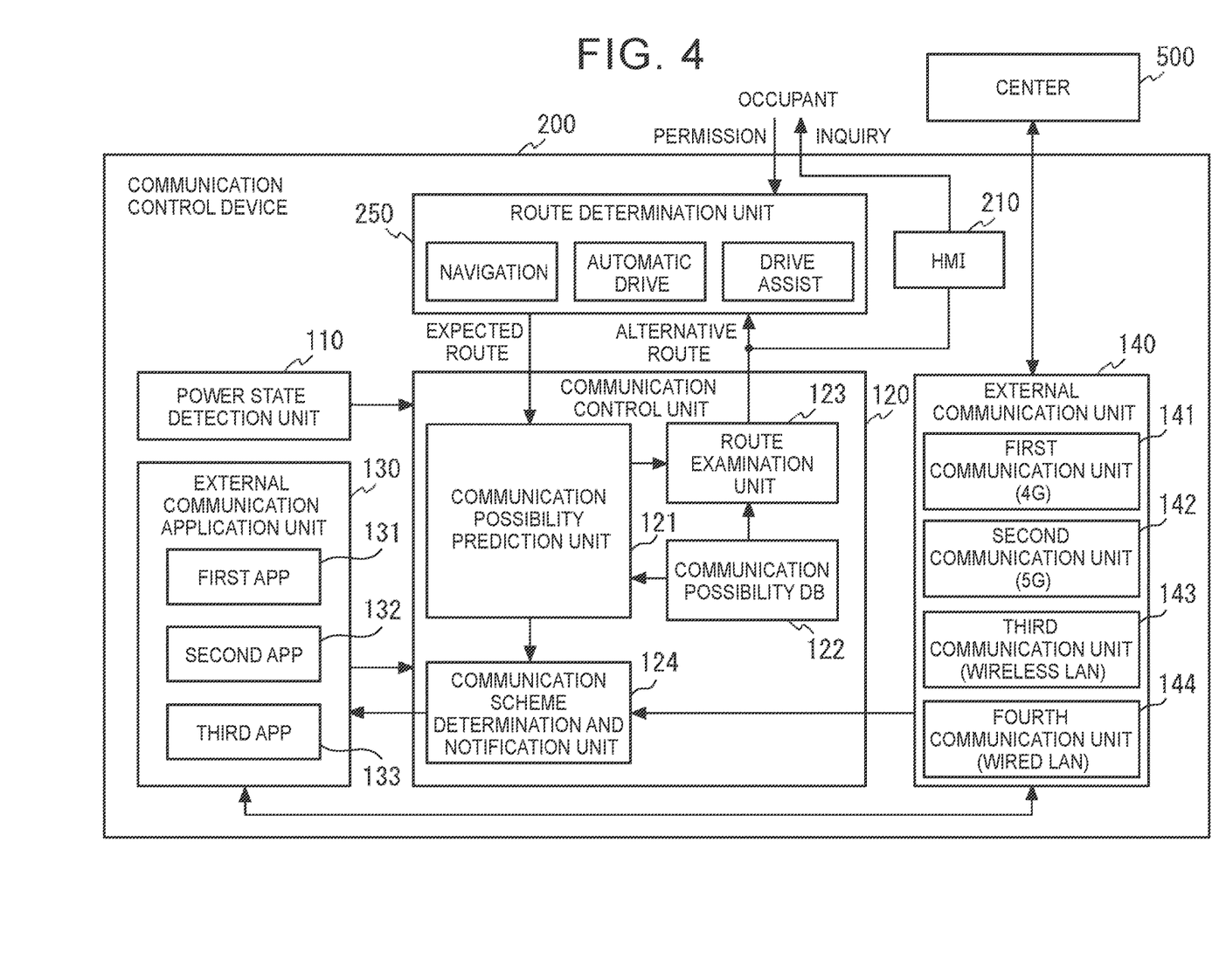
FIG. 4 is a functional block diagram of a communication control device according to a second embodiment and the surroundings.

FIG. 4 is a functional block diagram of a communication control device 200 according to a second embodiment of the present disclosure and the surroundings. The functional blocks illustrated in FIG. 4 include a communication control device 200 mounted on a vehicle and a center 500. The communication control device 200 has a processor, a main storage unit, an auxiliary storage unit, etc. These are connected to each other through a bus. The processor may be a central processing unit (CPU), a digital signal processor (DSP), etc. The processor performs various computations for information processing. The main storage unit may be a random access memory (RAM), a read only memory (ROM), etc. The auxiliary storage unit may be an erasable programmable ROM (EPROM), a hard disk drive (HDD), a solid state drive (SSD), a removable medium, etc. The auxiliary storage unit stores an operating system (OS), various programs, various tables, etc. The processor loads a program stored in the auxiliary storage unit to a work area of the main storage unit, executes the program, and controls the various constituent units etc. through execution of the program. The main storage unit and the auxiliary storage unit are each a computer-readable storage medium. Information stored in the auxiliary storage unit may be stored in the main storage unit. Meanwhile, information stored in the main storage unit may be stored in the auxiliary storage unit.

The communication control device 200 according to the second embodiment illustrated in FIG. 4 is different from the communication control device 100 according to the first embodiment illustrated in FIG. 1 in the configuration of a route determination unit 250 and a human machine interface device (HMI) 210. The communication control device 200 according to the second embodiment will be described below with main focus on differences in the configuration.

The human machine interface device 210 is a functional unit that carries out information transfer between the communication control device 200 and a user such as a driver, and can provide the user with information for inquiring whether a change may be made from an expected route to an alternative route. The inquiry may be made using display on a multi information display, a meter, etc., or sound via a speaker etc., for example.

The route determination unit 250 can determine an expected route along which the communication control device 200 is to move (travel). The route determination unit 250 includes a navigation function that provides guidance on the route to a destination location based on the map data, an automatic drive function that causes the vehicle to perform all the drive control, and a drive assist function that causes the vehicle to assist a part of drive control such as ACC, by way of example. The route determination unit 250 outputs information (such as passage positions and movement speeds between the passage positions) related to the expected route determined by such functions to the communication control unit 120 (the communication possibility prediction unit 121 thereof). In addition, when an alternative route suggested from the communication control unit 120 (the route examination unit 123 thereof) meets a predetermined condition determined in accordance with the safety and the movement need (such as arrival time, transfer cost, and comfort), the route determination unit 250 makes a change from the present expected route to the alternative route only when permission from the user is obtained.

In the communication control device 100 according to the above first embodiment, the route determination unit 150 determines whether to change the present expected route (first route) to the alternative route (second route) examined by the route examination unit 123 of the communication control unit 120 automatically based on the predetermined condition. In the communication control device 200 according to the second embodiment, on the contrary, the user such as the driver is inquired of whether a change may be made from the present expected route (first route) to the alternative route (second route) examined by the route examination unit 123 of the communication control unit 120 via the human machine interface device 210, and a change is made from the present expected route (first route) to the alternative route (second route) only when permission from the user is obtained. In this manner, the user can understand that the expected route along which the communication control device 200 is to move is to be changed or has already been changed, and therefore the user is not likely to be suspicious or uncomfortable.

Third Embodiment

Configuration

Figure 5:
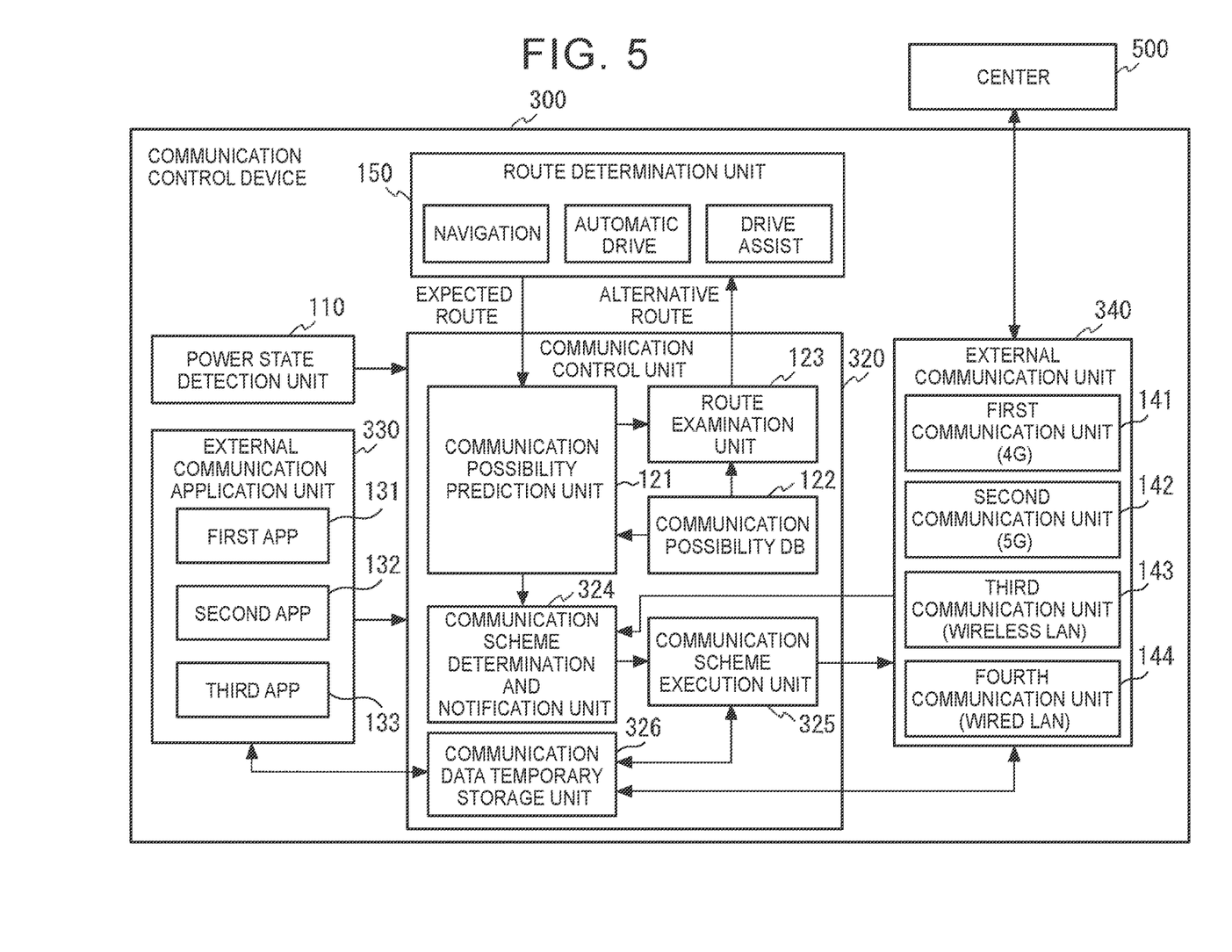
FIG. 5 is a functional block diagram of a communication control device according to a third embodiment and the surroundings.

FIG. 5 is a functional block diagram of a communication control device 300 according to a third embodiment of the present disclosure and the surroundings. The functional blocks illustrated in FIG. 5 include a communication control device 300 mounted on a vehicle and a center 500. The communication control device 300 has a processor, a main storage unit, an auxiliary storage unit, etc. These are connected to each other through a bus. The processor may be a central processing unit (CPU), a digital signal processor (DSP), etc. The processor performs various computations for information processing. The main storage unit may be a random access memory (RAM), a read only memory (ROM), etc. The auxiliary storage unit may be an erasable programmable ROM (EPROM), a hard disk drive (HDD), a solid state drive (SSD), a removable medium, etc. The auxiliary storage unit stores an operating system (OS), various programs, various tables, etc. The processor loads a program stored in the auxiliary storage unit to a work area of the main storage unit, executes the program, and controls the various constituent units etc. through execution of the program. The main storage unit and the auxiliary storage unit are each a computer-readable storage medium. Information stored in the auxiliary storage unit may be stored in the main storage unit. Meanwhile, information stored in the main storage unit may be stored in the auxiliary storage unit.

The communication control device 300 according to the third embodiment illustrated in FIG. 5 is different from the communication control device 100 according to the first embodiment illustrated in FIG. 1 in the configuration of a communication control unit 320, an external communication application unit 330, and an external communication unit 340. The communication control device 300 according to the third embodiment will be described below with main focus on differences in the configuration.

The external communication application unit 330 includes an application implemented by the communication control device 300, and can implement a predetermined service through communication with the center 500. In the present embodiment, the external communication application unit 330 implements three applications, namely a first app 131, a second app 132, and a third app 133. The first app 131, the second app 132, and the third app 133 are as discussed above.

The external communication application unit 330 outputs a communication need, which is a data transmission request and/or a data reception request, generated from one or more of the first app 131, the second app 132, and the third app 133, to the communication control unit 320. The communication need is as discussed above. In addition, when the communication need is a request for data transmission, the external communication application unit 330 outputs data to be transmitted to the communication control unit 320 (a communication data temporary storage unit 326 to be discussed later) in advance.

The external communication unit 340 is a communication interface for connecting the communication control device 300 to the center 500 directly or via a network. The external communication unit 340 according to the present embodiment includes the first communication unit 141, the second communication unit 142, the third communication unit 143, and the fourth communication unit 144 as communication means. The first communication unit 141, the second communication unit 142, the third communication unit 143, and the fourth communication unit 144 are as discussed above. In addition, the external communication unit 340 outputs operation information that indicates whether each of the first communication unit 141, the second communication unit 142, the third communication unit 143, and the fourth communication unit 144 is operating normally to the communication control unit 320 (a communication scheme determination and notification unit 324 thereof). In addition, when the communication need is a request for data reception, the external communication unit 340 outputs data received from the center 500 to the communication control unit 320 (the communication data temporary storage unit 326 thereof) in advance.

The communication control unit 320 controls communication made between the communication control device 300 and the center 500. The communication control unit 320 includes a communication possibility prediction unit 121, a communication possibility database (DB) 122, a route examination unit 123, a communication scheme determination and notification unit 324, a communication scheme execution unit 325, and the communication data temporary storage unit 326. The communication control unit 320 according to the third embodiment is different from the communication control unit 120 according to the first embodiment in the configuration of the communication scheme determination and notification unit 324, the communication scheme execution unit 325, and the communication data temporary storage unit 326.

The communication scheme determination and notification unit 324 determines a communication mode and a communication timing that are optimal for executing the communication need received from the external communication application unit 330 based on at least the possibility of communication on the expected route predicted by the communication possibility prediction unit 121 and operation information output from the external communication unit 340. When there is a plurality of communication needs, the communication scheme determination and notification unit 324 determines the communication mode and the communication timing for each of the communication needs based on the priority degree etc. given in advance to each communication need. In addition, the communication scheme determination and notification unit 324 may further determine a communication mode and a communication timing that are optimal for executing the communication need based on the power state of the communication control device 300 detected by the power state detection unit 110 and predicted power that can be used on the expected route. The communication mode and the communication timing may be determined for each app implemented by the external communication application unit 330, rather than for each communication need. Then, the communication scheme determination and notification unit 324 notifies the communication scheme execution unit 325 of the determined communication mode and communication timing.

The communication scheme execution unit 325 executes communication with the center 500 by instructing the communication data temporary storage unit 326 and the external communication unit 340 at the communication timing in accordance with the communication mode and the communication timing for each communication need indicated by the communication scheme determination and notification unit 324. Specifically, when the communication need is data transmission and the communication timing arrives, the communication scheme execution unit 325 instructs the communication data temporary storage unit 326 to send transmission data stored beforehand to the external communication unit 340, and instructs the external communication unit 340 to transmit the transmission data sent from the communication data temporary storage unit 326 to the center 500 in accordance with the determined communication mode. When the communication need is data reception and the communication timing arrives, meanwhile, the communication scheme execution unit 325 instructs the external communication unit 340 to receive data from the center 500 in accordance with the determined communication mode, and instructs the communication data temporary storage unit 326 to acquire the data received by the external communication unit 340 and output such data to the external communication application unit 330.

The communication data temporary storage unit 326 is a memory that can temporarily store communication data, and can receive and store transmission data and/or reception data that are input and output the stored transmission data and/or reception data based on an instruction from the external communication application unit 330 and/or the communication scheme execution unit 325.

In the communication control device 100 according to the above first embodiment, an app of the external communication application unit 130 for which a communication need is generated needs to transmit data to the external communication unit 140 and receive data from the external communication unit 140 each time a notification is received from the communication scheme determination and notification unit 124 in accordance with the communication timing. Therefore, a significant load acts on an app related to the data transmission and reception processes. In the communication control device 300 according to the third embodiment, on the contrary, the communication control unit 320 integrally controls data transmission and reception between the external communication application unit 330 and the external communication unit 340. Thus, an app for which a communication need is generated can transfer all the data in the communication data temporary storage unit 326 beforehand, or collectively receive all the data from the communication data temporary storage unit 326, without being restrained by the communication mode or the communication timing. Therefore, the load of an app related to the data transmission and reception processes can be reduced.

Function and Effect

In the communication control device according to each of the embodiments of the present disclosure discussed above, the communication mode which is used by the application for communication with the center as an external device while the vehicle on which the communication control device is mounted is moving is controlled based on the expected route, the communication possibility information, and the communication content required by the communication need generated by the application. Through this control, a situation in which the communication control device is not connectable to the center at an expected position or a desired communication band cannot be obtained although the communication control device is connectable to the center, is avoided, and therefore the communication mode during movement can be controlled optimally.

With the method according to the present disclosure, when there is a location at which the communication mode is limited such as a tunnel on the expected route, for example, the communication control device can grasp passage through the tunnel, and thus an optimum communication mode can be predicted accurately beforehand during passage through the tunnel. Hence, an unnecessary process of switching the communication mode is suppressed by switching the communication mode of the communication control device to a communication mode predicted beforehand immediately before passage through the tunnel, which suppresses degradation of the power efficiency and occurrence of temporary interruption or delay in communication. Even if there is a route nearby that is different from the expected route and that does not pass through the tunnel, the method according to the present disclosure controls the communication mode based on the expected route, and therefore the communication cost can be suppressed since there is no need to stand by with a communication mode at a high communication cost that provides reliable connection because of the inability to determine whether to pass the tunnel.

When a communication need is generated when the power state of the communication control device is in the IG state, the method according to the present disclosure enables control in which communication is performed through wired LAN connection at a charge station without performing communication through wireless LAN connection at an intersection at the middle of the route, if there is a position at which the power state is in the Plug-In state in the near future on the expected route. Consequently, wireless communication is not performed to wastefully consume generated power, and consumption energy and the communication cost can be suppressed.

With the method according to the present disclosure, in addition, it is possible to precisely predict, based on the expected route, how long the vehicle is stationary at an intersection at which connection to wireless LAN is available and how much data can be transmitted and received. Therefore, control can be performed so as to communicate all the data without interruption. Consequently, it is possible to suppress degradation of the power efficiency due to a data retransmission process. In addition, it is possible to further improve the power efficiency and reduce the communication cost by intentionally changing to an alternative route along which the vehicle is stationary at an intersection at which connection to wireless LAN is available in a range (such as arrival time, transfer cost, and comfort) allowed by the communication need.

With the method according to the present disclosure, when the communication environment is unevenly distributed in a large parking lot, the expected route can be changed such that the vehicle on which the communication control device is mounted is parked at a location in a good communication environment (with connection to wireless LAN, a wide communication band, a low disconnection rate, etc.). Consequently, communication can be completed in a short time while the vehicle is parked. Therefore, it is possible to further improve the power efficiency and reduce the communication cost.

While embodiments of the present disclosure have been described above, the present disclosure can be grasped as a communication control device, a battery control method executed by the communication control device which includes a processor and a memory, a control program for executing the battery control method, a computer-readable non-transitory storage medium that stores the control program, and a vehicle on which a power source system including the communication control device is mounted.

The present disclosure may also be implemented by supplying a computer program that implements the function described in relation to the above embodiment to a computer of the communication control device, and one or more processors of the computer reading and executing the program. Such a computer program may be provided to a computer by a computer-readable non-transitory storage medium that is connectable to a system bus of the computer, or may be provided to the computer via a network. The computer-readable non-transitory storage medium may include a disk of any type such as a magnetic disk (such as a floppy disk and a hard disk drive) and an optical disk (such as a Compact Disc Read Only Memory (CD-ROM), a Digital Versatile Disc (DVD), and a Blu-ray Disc), and a medium of any type that is suitable for storing an electronic instruction, such as a read only memory (ROM), a random access memory (RAM), an Erasable Programmable Read Only Memory (EPROM), an Electrically Erasable Programmable Read Only Memory (EEPROM), a magnetic card, a flash memory, and an optical card.

The present disclosure may be used for a communication control device, a communication control method, a non-transitory storage medium, and a vehicle to connect to an external device using a plurality of communication modes.

What is claimed is:

1. A communication control device configured to be connected to an external device by using a plurality of communication modes, the communication control device comprising:

a storage unit configured to store communication possibility information in which positions and communication modes are correlated with each other, the positions being positions at which the communication control device is connectable to the external device, the communication modes being usable at the positions, among the plurality of communication modes;

an acquisition unit configured to acquire a first route as an expected route along which the communication control device is to move;

a control unit configured to control a communication mode while the communication control device is moving, based on the first route, communication possibility information, and a communication content required by an application, the communication mode being used by the application implemented by the communication control device for communication with the external device; and a communication unit configured to execute communication between the application and the external device by using the communication mode controlled by the control unit.

2. The communication control device according to claim 1, wherein:

the communication content has at least one of a communication data amount, an allowable delay time, whether interruption in communication occurs, and an allowable communication cost; and the control unit is configured to control a communication mode that is used by the application for the communication with the external device so as to meet the communication content.

3. The communication control device according to claim 2, further comprising a detection unit configured to detect a power state of the communication control device, wherein the control unit is configured to control the communication mode that is used by the application for the communication with the external device so as to meet the communication content based on variations of the power state predicted on the first route.

4. The communication control device according to claim 1, wherein the communication unit is configured to execute the communication between the application and the external device based on a priority degree of each of requests when the requests are generated from the application.

5. The communication control device according to claim 1, further comprising a route examination unit configured to suggest a second route that is different from the first route based on the first route, the communication possibility information, and the communication content, wherein:

the control unit is configured to control the communication mode by changing the expected route from the first route to the second route when the second route is determined to meet a condition required for the expected route;

the communication mode is used by the application for the communication with the external device; and the expected route being a route along which the communication control device is to move.

6. The communication control device according to claim 5, wherein the second route is a route with a high communication efficiency compared to the first route.

7. The communication control device according to claim 5, wherein the condition required for the expected route has at least one of an arrival time at a destination location of the expected route and a cost of transfer to the destination location.

8. The communication control device according to claim 5, wherein the control unit is configured to implement a change from the first route to the second route based on permission by a user of the communication control device.

9. The communication control device according to claim 1, wherein the positions are further correlated with at least one of a time, a weather, a passage speed, a communication band, power required for communication, a communication disconnection rate, and a communication error rate, together with the communication modes, in the communication possibility information.

10. A communication control method executed by a computer of a communication control device configured to be connected to an external device by using a plurality of communication modes, the communication control method comprising:
   acquiring a first route as an expected route along which the communication control device is to move;
   controlling a communication mode while the communication control device is moving, based on the first route, communication possibility information, and a communication content required by an application, the communication mode being used by the application implemented by the communication control device for communication with the external device, the communication possibility information being information that a storage unit of the communication control device stores and in which positions and communication modes are correlated with each other, the positions being positions at which the communication control device is connectable to the external device, the communication modes being usable at the positions among the plurality of communication modes; and
   executing communication between the application and the external device by using the controlled communication mode.

11. A non-transitory storage medium storing instructions that are executable by one or more processors in a computer of a communication control device configured to be connected to an external device by using a plurality of communication modes and that cause the one or more processors to execute functions comprising:
   acquiring a first route as an expected route along which the communication control device is to move;
   controlling a communication mode while the communication control device is moving, based on the first route, communication possibility information, and a communication content required by an application, the communication mode being used by the application implemented by the communication control device for communication with the external device, the communication possibility information being information that a storage unit of the communication control device stores and in which positions and communication modes are correlated with each other, the positions being positions at which the communication control device is connectable to the external device, the communication modes being usable at the positions among the plurality of communication modes; and
   executing communication between the application and the external device by using the controlled communication mode.

\* \* \* \* \*